(12) United States Patent
Smith

(10) Patent No.: US 7,645,946 B2
(45) Date of Patent: Jan. 12, 2010

(54) TWO-PIECE PIPE ESCUTCHEON

(76) Inventor: Jeffrey M. Smith, 4421 Conestoga Rd., Elverson, PA (US) 19520

( * ) Notice: Subject to any disclaimer, the term of this patent is extended or adjusted under 35 U.S.C. 154(b) by 0 days.

(21) Appl. No.: 11/383,237

(22) Filed: May 15, 2006

(65) Prior Publication Data

US 2007/0261884 A1    Nov. 15, 2007

(51) Int. Cl.
*H02G 3/18* (2006.01)
(52) U.S. Cl. ............ 174/650; 174/66; 174/67; 220/241; 220/242; 285/46; 248/56
(58) Field of Classification Search ........ 174/650, 174/66, 67, 135, 480, 656, 657, 663, 664, 174/152 G, 153 G, 155, 156; 248/56; 16/2.1, 16/2.2, 402; 138/111, 112; 285/65, 46; D8/350; 220/241, 242; D23/249

See application file for complete search history.

(56) References Cited

U.S. PATENT DOCUMENTS

| | | | | |
|---|---|---|---|---|
| 1,278,895 A | * | 9/1918 | Farley | 285/46 |
| 1,835,155 A | * | 12/1931 | Harbert | 248/56 |
| 3,749,815 A | * | 7/1973 | Boatwright et al. | 174/66 |
| 4,407,023 A | * | 10/1983 | Norton | 285/46 |
| 4,517,408 A | * | 5/1985 | Pegram | 174/153 G |
| 4,560,083 A | * | 12/1985 | Danico | 220/241 |
| 4,627,647 A | * | 12/1986 | Hauff | 174/650 |
| 4,656,689 A | * | 4/1987 | Dennis | 174/153 G |
| D356,362 S | * | 3/1995 | Bourgeois et al. | D23/249 |
| 5,481,790 A | * | 1/1996 | Koreis et al. | 220/242 |
| 5,504,276 A | * | 4/1996 | Kunze | 174/152 G |
| 6,070,928 A | * | 6/2000 | Campbell | 174/152 G |
| 6,161,589 A | * | 12/2000 | Bolotte et al. | 138/112 |
| 6,211,465 B1 | * | 4/2001 | Streit | 248/56 |
| 7,112,744 B1 | * | 9/2006 | DeCosta | 174/66 |
| 7,507,912 B1 | * | 3/2009 | Sempliner et al. | 174/153 G |

* cited by examiner

*Primary Examiner*—Angel R Estrada

(57) ABSTRACT

Two symmetrical pieces form an escutcheon that seals the gap between a pipe or conduit and the surface through which it penetrates and supports the pipe or conduit. The device is surface mounted with threaded mechanical fasteners which can be adjusted to vary the compression of the sealing gaskets. The escutcheon can be installed without requiring any manipulation of the pipe or conduit. The escutcheon can be removed and reinstalled repeatedly without any degradation in function.

2 Claims, 1 Drawing Sheet

TWO-PIECE PIPE ESCUTCHEON

BACKGROUND OF THE INVENTION

In almost all applications, it is desirable to seal the gap between a pipe or conduit and the surface through which the pipe or conduit passes. This is most commonly done by injecting a liquid such as caulk into the gap and then covering the gap with a decorative escutcheon. Several disadvantages of this method are addressed by this invention.

When a sealing product such as caulk is used, any change that needs to be made to the pipe or conduit requires that the caulk be removed, usually involving considerable hand labor and possible damage to the pipe or conduit.

Pipe escutcheons are known in the prior art. Known prior art includes: U.S. Pat. No. 4,560,083, U.S. D356,362, U.S. Pat. No. 1,278,895, U.S. Pat. No. 1,835,155, U.S. Pat. No. 6,070,928, U.S. Pat. No. 4,517,408, U.S. Pat. No. 4,407,023, U.S. Pat. No. 4,627,647, U.S. Pat. No. 5,504,276, U.S. Pat. No. 6,211,465, U.S. Pat. No. 4,656,689 and U.S. Pat. No. 6,161,589. Bolette in U.S. Pat. No. 6,161,589 discloses a device for sealing the hole around a pipe. While this device does seal the hole around a pipe, it suffers several disadvantages. The very low profile severely limits any support the device can provide to the pipe. The snap design used to engage the device around the pipe cannot be adjusted and so the gasketed seal cannot be adjusted to account for variations in smoothness of the pipe surface. The device uses an adhesive to attach it to the mounting surface. Adhesive mounting severely limits the type of surfaces that the device would work on (i.e. smooth). It also severely limits the ability to remove and reuse the device. Adhesive mounting also limits the amount of support the device can provide. Adhesive mounting also limits the weather conditions under which the device would perform successfully. Adhesive mounting also prevents the use of a gasket that can be compressed between the device and the mounting surface, as in Koreis et al (U.S. Pat. No. 5,481,790.

While the aforementioned devices fulfill their intended purposes the aforementioned patents do not disclose an adjustable and reusable escutcheon that seals with compressed gaskets at both the pipe and mounting surface and supports a pipe or conduit that can be surface mounted. As such, the present invention substantially departs from the designs of the prior art, and in so doing provides a device that is adjustable and reusable that seals and supports a pipe or conduit.

SUMMARY OF THE INVENTION

The current invention is an escutcheon formed by the interlocking of two symmetrical pieces having inclined mating surfaces and threaded mechanical fasteners that create a gasketed seal between a pipe or conduit and a surface. The escutcheon thus formed can be removed without manipulation of the pipe or conduit. The escutcheon also provides support for the pipe or conduit. The escutcheon thus formed is adjustable and reusable.

It is an objective of the present device to provide a new escutcheon for sealing and supporting a pipe or conduit which has many advantages over the prior art and that are not anticipated by the prior art.

It is also an objective of the present device to provide a new escutcheon for sealing and supporting a pipe or conduit which provides some of the advantages of the prior art while simultaneously providing new advantages and overcoming the disadvantages of the prior art.

DETAILED DESCRIPTION OF THE INVENTION

Figure 3:
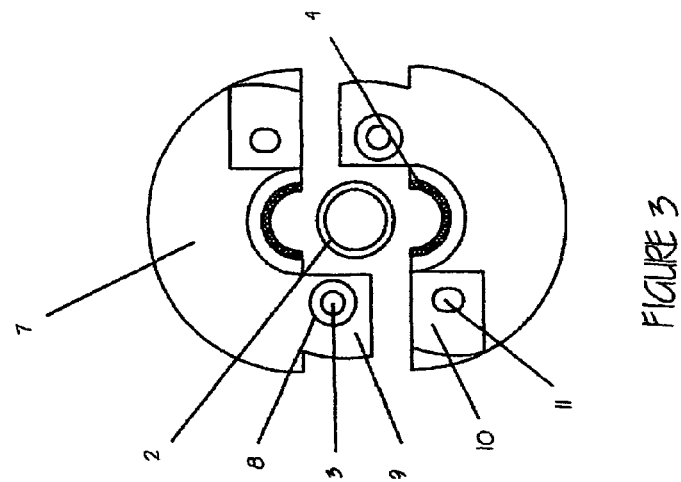
FIG. 3 is a top elevation of the device.
Figure 1:
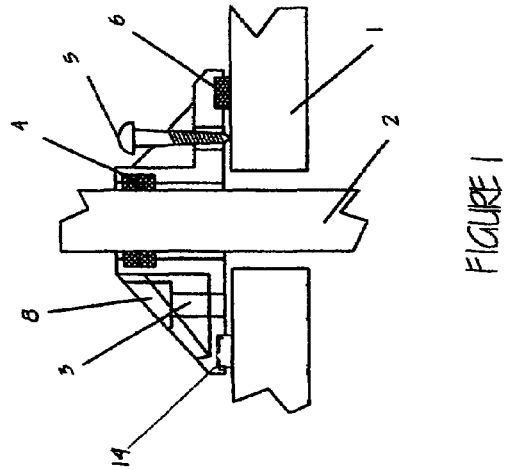
FIG. 1 is a section view of the device.
Figure 2:
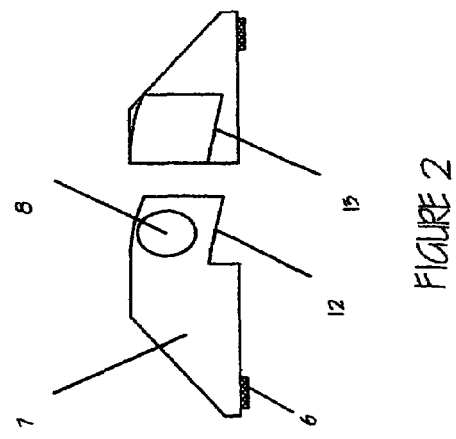
FIG. 2 is a side elevation of the device.

In the figures a pipe/conduit (2) penetrates a surface (1). The two symmetrical pieces (7) are placed around the pipe/conduit (2) with the tabs (9) aligned in the tab receivers (10). The mounting screws (5) are placed through the tab holes (3) and the receiver holes (11) and tightened to the surface (2). The heads of the mounting screws (5) recess into the tabs (9) at the screw head recess (8). As the screws (5) are tightened, the tabs inclined faces (12) meet the receivers inclined faces (13), drawing the tabs (9) Into the receivers (10). As this occurs, the pipe/conduit gasket (4) is compressed against the pipe/conduit (2), creating a seal. Simultaneously, as the mounting screws (5) are drawn tight to the surface (1) the surface gasket (6) is compressed against the surface (1), creating a seal. Thus mounted, the symmetrical pieces (7) form an escutcheon that seals the space between the pipe/conduit (2) and the surface (1). The escutcheon also effectively supports the pipe/conduit (2) at the compressed gasket (4). The removal of the mounting screws (5) allows for the escutcheon to be removed without requiring any manipulation of the pipe/conduit (2).

What is claimed is:

1. A device for sealing an opening around a pipe or conduit extending through a surface and supporting the pipe or conduit: said device having a generally circular perimeter and a front and back face; consisting of two symmetrical pieces with inclined mating surfaces; said two symmetrical pieces having a resilient gasket on the back face; said two symmetrical pieces creating a hole through which a pipe or conduit may pass; said hole having a resilient gasket along its perimeter; said inclined mating surfaces having elliptical holes through them; said elliptical holes having mechanical fasteners passed through them; wherein when said fasteners are tightened said inclined mating surfaces draw said symmetrical pieces tight around a pipe or conduit; wherein when said fasteners are tightened said symmetrical pieces are simultaneously drawn tight to said surface through which a pipe or conduit extends; wherein the tightness of the mechanical fasteners can be adjusted.

2. The device of claim 1 wherein said symmetrical pieces have a channel let into the outer perimeter of the back face parallel to the mounting surface into which a resilient gasket is let.

* * * * *